United States Patent [19]

French

[11] 4,430,613
[45] Feb. 7, 1984

[54] PIPELINE INSPECTION AND MAINTENANCE METHOD INCLUDING MOVING A MAGNETIC FIELD RESPONSIVE DEVICE ALONG THE ROUTE OF THE PIPELINE

[76] Inventor: Hartley A. French, 67 Aldershot Crescent, Willowdale, Ontario, Canada

[21] Appl. No.: 172,796

[22] Filed: Jul. 28, 1980

[51] Int. Cl.³ .................. G01R 33/12; G01N 27/72
[52] U.S. Cl. .................. 324/200; 324/220; 324/226
[58] Field of Search ............ 324/52, 67, 54, 209, 324/200, 219–221, 226, 326, 345, 348, 365

[56] References Cited

U.S. PATENT DOCUMENTS

| | | | |
|---|---|---|---|
| 2,238,072 | 4/1941 | Nelson et al. | 324/326 X |
| 2,501,598 | 3/1950 | Eltenton et al. | 324/67 |
| 2,940,302 | 6/1960 | Scherbatskoy | 324/220 |
| 3,745,452 | 7/1973 | Osburn et al. | 324/54 |
| 3,754,275 | 8/1973 | Carter et al. | 324/67 X |
| 4,061,965 | 12/1977 | Nelson | 324/52 X |
| 4,228,399 | 10/1980 | Rizzo et al. | 324/365 X |
| 4,320,340 | 3/1982 | Lichtenberg | 324/221 |
| 4,365,191 | 12/1982 | Weldon et al. | 324/348 |

Primary Examiner—Gerard R. Strecker

[57] ABSTRACT

A magnetometer is moved along the route of a pipeline and the output of the magnetometer is observed to identify pipeline characteristics. Used with a buried pipeline the magnetometer is moved over the surface of the overlay to identify and locate girth welds, pipeline fittings and accoutrements, changes in pipeline metallurgy such as occur with large hard spots and changes in wall thickness as occur in extensive and severe corrosion. Similar functions can be performed with underwater pipelines using a magnetometer which is located in an appropriate container and trolled along the route of the pipeline by a vessel. The pipeline is formed of pipe sections which are arranged in an identifiable pattern according to their magnetic characteristics to facilitate inspection and maintenance.

8 Claims, 2 Drawing Figures

PIPELINE INSPECTION AND MAINTENANCE METHOD INCLUDING MOVING A MAGNETIC FIELD RESPONSIVE DEVICE ALONG THE ROUTE OF THE PIPELINE

BACKGROUND OF THE INVENTION

This invention is concerned with the inspection and maintenance of pipelines. Over land areas pipelines are usually buried under a three or four foot overlay or, where ground conditions preclude burying the line, as for example in frigid zones or over rivers, it is supported aboveground on spaced support structures. Pipelines conveying materials underwater are usually protectively coated, as for example with concrete, and are submerged to lie on the lake or seabed.

Whatever the environment of the pipeline, the risk of pipeline failure is ever present and the consequences of such failure are potentially grave. As a result, it is desirable to inspect the pipeline as it is installed and thereafter to perform regular inspections to detect any weaknesses prior to failure.

It has been generally recognized that effective inspection of pipeline from the outside of the line is not possible because of the necessarily great spacing between the sensor used for the inspection and the line, because of the large background fields produced by the mass of the line and by earth and because of the impracticability of passing an external sensor over the line. Thus the most widely accepted inspection technique is to pass a pig through the pipeline, the pig having one or more instruments for detecting such weaknesses as areas of corrosion, pitting or out-of-round conditions.

The pig may be driven through the pipeline by fluid flowing in the line or it may be carried by a crawler which includes drive means. Whichever method is used it is common to have the instruments coupled to a recording device as for example a pen recorder which produces a trace related to some characteristic of the pipeline. As the pig is recovered, the record is inspected and suspect areas of potential weakness identified. It then remains physically to locate the suspect area, assess its significance and, if need be, repair it.

Since the rate of progression of the pig through the pipeline is rarely, if ever, constant, the trace bears little relationship to the geographical location of the suspect area. Odometers of various kinds have been associated with the pigs in attempts to correlate the pig signals with the geographical location of the suspect area indicated by those signals but the odometers are in many instances inherently inaccurate in this environment or quickly become worn or maladjusted. Thus this solution has not proven entirely satisfactory. The problem has been exacerbated by the fact that the distances recorded by the odometers are relatively large and by the fact that the pipeline does not usually follow a rectilinear path. Thus the length of pipeline measured by the odometer is not necessarily related to the distance covered by the pipeline.

A common pig is one which examines magnetic characteristics of the pipeline and moves sensors along the interior wall of that pipeline. The device produces a signal proportional to the flux changes in the field produced by the pipeline and a skilled reader of the trade produced by the instrument can, in some instances, identify the nature of conditions in the pipeline causing anomalies in that trace. The girth welds between adjacent sections making up the line can also be identified, because there is a change in the metallurgical characteristic of the wall produced during the welding process or because wall thickness changes or because of the surface roughness of the weld. Pipeline fittings can also be detected, Other types of instruments can also identify some of these characteristic features. Thus a count of the number of girth welds can give a general indication of the geographical location of a suspect part of the line which must be physically inspected. However, because the lengths of the sections making up the pipelines are not constant, because of the large distances involved and of course because the pipeline does not follow a rectilinear course commonly an error of as much as several hundred feet may occur.

Thus with submerged or buried pipeline the technique which has been adopted involves identifying on the trace a specific feature of the pipeline such as a short pipe section or a fitting closest to the suspect area which must be inspected and measuring the distance between that feature and the suspect area as best one can from the trace either by counting girth welds or by the use of an odometer which will be reasonably accurate over the relatively short distance involved. From a map of the line one may then approximately locate that feature. The buried line is then excavated, positively to locate the feature and having made that location the distance to the suspect area may be measured off and that area excavated.

Besides being a time consuming and hence costly procedure, there is a substantial element of risk involved in making these two excavations. The excavations are usually made with a hoe or other mechanical digger and the operator may easily err and damage the pipeline even to the extent of rupturing it.

With a submerged line it becomes necessary to send down one or more divers to uncover and locate the feature and thereafter the diver or divers must move to the suspect section and uncover it.

The present invention seeks to provide an inspection and maintenance method to alleviate the disadvantages of the existing methods.

It is recognized that the sections of pipe which are used to form the pipeline become magnetized to a limited extent during the manufacturing or handling processes. Perhaps because of the opinion that the sections when jointed together would lose their magnetism or that joining them would have the effect of forming a single bar magnet of length equal to the overall length of the pipeline, no value or significance has been attributed to this characteristic. On the contrary, it has been considered to be a nuisance by welders joining the sections end to end when their welding rods have been attracted to and have adhered to the ends of the sections and research temporarily to degauss or demagnetize the end portions of sections of pipe to facilitate welding has been undertaken by others.

For whatever reason, universally it has been reckoned that the anomaly produced at such welds could only be observed by using an inspection pig based on magnetic principles.

I have now discovered that not only do the pipe sections of a pipeline retain their individual bar-magnet characteristics but also that by using a magnetic field responsive means, which in some instances may be a relatively simple device of only routine sensitivity, one may detect the junction between adjacent sections even from a distance of several feet and through an overlay or in water.

Contrary to other experts belief that the magnetic anomaly representing a girth weld in a buried line could not be detected from aboveground, because the anomaly would be lost in the noise produced by earth field and by the field produced by the mass of the pipeline, I have found that not only can I clearly identify that anomaly but I can also identify other features such as fittings and changes in pipeline metallurgy and wall thickness including some which may be dejects such as large hard spots and severe and extensive corrosion.

Accordingly there is provided according to this invention a pipeline inspection andd maintenance method comprising moving a magnetic field responsive device along the route of a pipeline and observing the output of that device to identify pipeline characteristics.

According to another aspect of this invention there is provided a method of inspecting and maintaining a pipeline which comprises moving a magnetic field responsive device over the course of a pipeline, identifying the location of a specific feature of that pipeline and using that location as a datum from which to locate a suspect area of the pipeline.

Using the technique of this invention in a buried line one would examine a record produced by a pig and identify a suspect portion of the line and the nearest specific or characterising feature of the pipeline such as a short section, a fitting, as for example a drip, or a junction or intersection. The distance between the specific feature and the suspect portion is noted either from a record produced from an odometer on the pig or by counting girth welds as recorded by the pig and thereafter consultation of a map of the line gives an approximate location of the specific feature. The pipeline is then examined in that location by following its course with a magnetic field responsive device such as for example a magnetometer or an inclinometer (dip needle). This examination will reveal the precise location of the specific feature and thereafter it is a simple matter to move from that feature to the suspect portion of the pipeline. This procedure will eliminate the dangerous, time consuming and hence, costly, procedure of excavating the pipe in two locations.

The method is also available for use with submerged pipeline. In such instances a sensor is enclosed within a container suitable for trolling along the route of the pipeline, the position of the container being controlled for example by reference to a depth guage. The position of the pipeline is first determined by crossing the route of the pipeline and placing marker buoys as the magnetic field sensitive device detects the pipeline. Thereafter the container is trolled over the route of the line and some small distance above it and the location of a specific feature of that line positively established.

It has also been observed that the signal produced by the magnetic field responsive device as it passes over a junction between the ends of adjacent pipe sections which are of like polarity is markedly greater than when the device is passed over a junction of which the ends of adjacent sections are of opposite polarity. Thus it is proposed according to this invention to identify the polarity of the ends of the sections as the line is assembled (which can be done for example using a simple compass) and order the sections so that there is a junction of adjacent like poles at regular intervals along the route of the pipeline. Such functions provide a very readily identifiable specific feature of the pipeline.

A typical magnetometer useful in the methods according to this invention is a portable proton magnetometer. A specific model is that available from Barringer Research Limited of Rexdale, Ontario, and which is identified by that company as their Model GM-122. That type of magnetometer comprises a proton rich fluid such as kerosene and means for inducing a field in it. This causes the protons to align along the magnetic field vector and when the field is removed the protons act as elementary gyroscopes and begin precessing around the remaining magnetic field, i.e. that of the earth and, in its application herein, also that of the pipeline. The precession frequency is directly proportional to the field and can be read with a high degree of accuracy.

DESCRIPTION OF THE FIGURES OF THE DRAWINGS

Embodiments of the invention are illustrated, very schematically, in the accompanying drawings in which.

Figure 1:
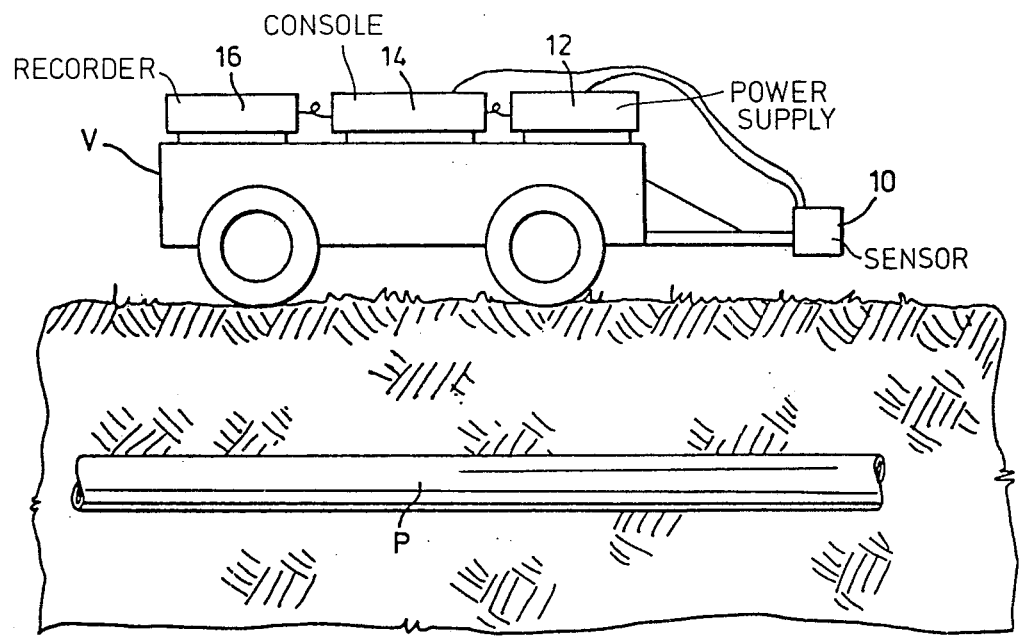
FIG. 1 is illustrative of the present invention as applied to buried pipeline.

In the method illustrated schematically in FIG. 1 a wheeled non-magnetic vehicle V is used in inspecting and maintaining a pipeline P buried at a depth of two or three feet below the surface of the ground. The vehicle includes a magnetometer having a sensor 10, a power supply 12, a console 14 and a recorder, if necessary, at 16.

To inspect the line firstly a pig is passed through it and a trace is produced which will indicate the existence of a suspect part of the pipe which should be excavated and physically examined. That trade will also give an indication of a specific identifying characteristic of the pipeline and its location within the pipeline relative to the suspect area. That identifying feature can be approximately located from a map of the pipeline. Thereafter the vehicle V is used to follow the route of the pipeline with magnetometer 10 and that will positively and accurately locate the identifying characteristic. Thereafter it is a simple matter to move along the pipeline the distance indicated from the pig trace to the suspect part or area.

Figure 2:
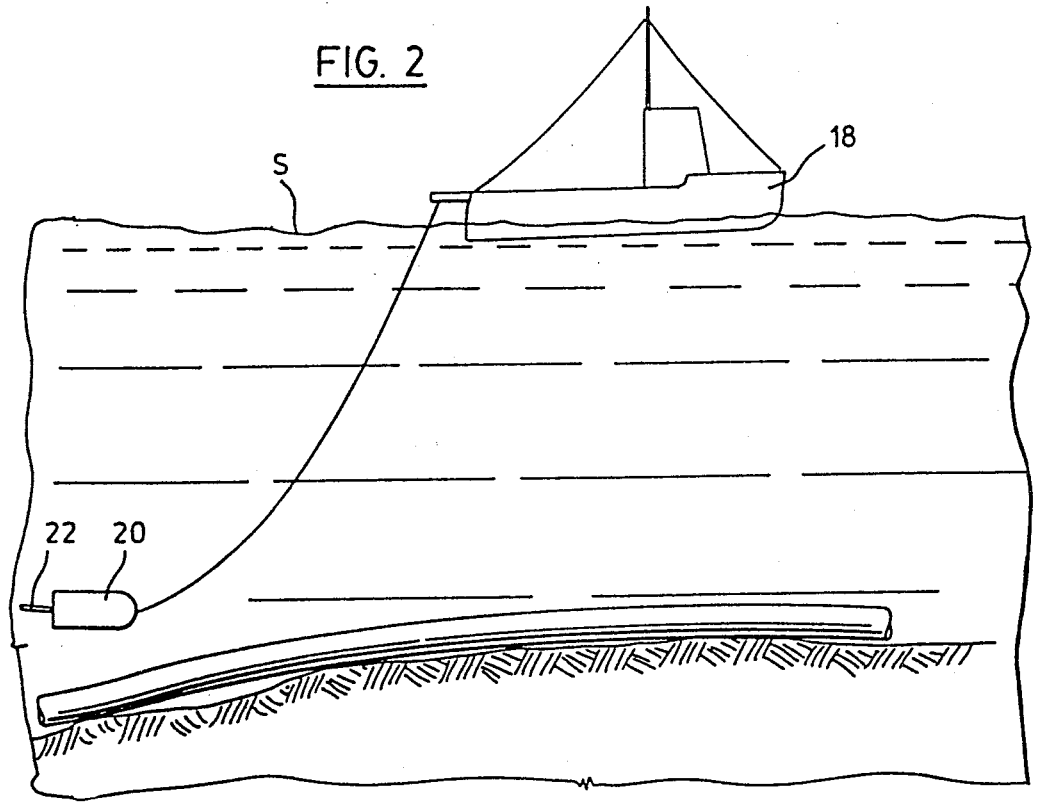
FIG. 2 is illustrative of the present invention as applied to submerged pipeline.

In FIG. 2 there is illustrated the method as applied to a pipeline P submerged under water of which the surface is indicated at S, the pipeline lying on the bed of that body of water. A vessel 10 is used to troll a container 12 within which a magnetometer sensor is disposed. The sensor may be provided with skids or the like so that it may be moved along the bed of the body of water or it may be provided with a depth controlling vane 23 operated in response to a depth guage or similar device on the vessel 10. In operation the pipeline is first located with the magnetometer by criss-crossing it and marker buoys are put out to mark the pipeline. Thereafter the container 20 and with it the magnetometer is caused to follow the route of the pipeline and locate an identifying characteristic feature of the pipeline in much the same manner as described hereabove with reference to FIG. 1. Divers may then move directly to a suspect region of the pipeline and effect inspection and, if need be, repair.

When using a magnetometer or other sensitive magnetic field responsive device it is possible to detect magnetic field anomalies such as are produced by areas of the pipeline of different metallurgical characteristics, as for example hard spots. Further it is possible to detect magnetic field anomalies produced by reduced wall thickness of the pipeline as result from severe and extensive corrosion of the pipeline.

As noted hereabove the pipe joints which make up the pipeline are magnetized during production and handling and form relatively weak bar magnets. The field anomaly produced by adjacent pipe sections which are butted with like poles together is noticably more pronounced than those formed with unlike or opposite poles together. Thus it is preferred that certain joints at regularly spaced intervals along the route of the pipeline be ones at which the end portions of the sections are of like polarity and that the joints in between should be of opposite polarity. The joints of like polarity provide a very easily identifiable specific feature of the pipeline.

It will be appreciated that the present invention is subject to various modifications. The form of the magnetometer may be chosen according to the particular conditions encountered. It may be possible in certain instances to use a simple inclinometer. Further although simple wheeled structures have been illustrated in the methods applied to land area pipelines, it will be recognized that it is possible to use a hand held magnetometer with any appropriate support means and it is also possible to suspend a magnetometer from, for example a helicopter and perform the inspection process by flying along the route of the pipeline.

I claim:

1. A method of inspecting and maintaining a pipeline including the steps of passing an inspection pig through the pipeline and making a record of the pipeline characteristics observed by said pig including areas of said pipeline suspected of weakness and of specific identifiable features of the pipeline; recording the output of an odometer carried by said pig so that the observed characteristics can be related to said recording of the output of the odometer;

moving a magnetic field responsive device along the route of the pipeline and exterior of the pipeline, identifying the geographical location of a selected one of said specific identifiable features of the pipeline using that device, correlating that feature with the same feature in the record and observing the distance between that feature and an area of suspected weaknesses recorded by said odometer and, using the geographical location of said feature as a datum from which to measure off said distance, finding the geographical location of said area suspected of weakness.

2. The method of claim 1 wherein said specific feature is a girth weld.

3. The method of claim 1 or claim 2 wherein said pipeline is a buried pipeline and wherein said magnetic field responsive device is moved along the route of the pipeline on the surface of the overlay of the pipeline.

4. The method of claim 1 wherein said magnetic field responsive device is a magnetometer.

5. The method of claim 1 or claim 2 wherein said pipeline is a submerged pipeline and wherein said magnetic field responsive device is trolled along the route of the pipeline by a vessel.

6. The method of claim 1 wherein the output of the device is observed to identify metallurgical anomalies indicative of a hard spot in the pipeline and wherein the pipeline is exposed in an area indicated by the device to have such a metallurgical anomaly.

7. The method of claim 1 wherein the output of the device is observed to identify an area of reduced wall thickness of said pipeline indicative of severe corrosion and wherein said pipeline is exposed in an area indicated by the device to have reduced wall thickness.

8. The method of claim 1 wherein the output of the device is observed to identify girth welds and wherein pipe sections making up the pipeline are ordered so that the sections have adjacent end portions of like magnetic polarity at regularly spaced intervals along the route of the pipeline.

* * * * *